(12) United States Patent
Taylor (10) Patent No.: US 6,570,049 B2
(45) Date of Patent: May 27, 2003

(54) INCINERATION SYSTEM FOR REFUSE-DERIVED FUELS, COAL AND PETROLEUM COKE, OR CHLORINATED HYDROCARBONS

(76) Inventor: Tommy G. Taylor, 4011 Creole St., Lake Charles, LA (US) 70605

( * ) Notice: Subject to any disclaimer, the term of this patent is extended or adjusted under 35 U.S.C. 154(b) by 0 days.

(21) Appl. No.: 09/968,997

(22) Filed: Oct. 2, 2001

(65) Prior Publication Data

US 2002/0010382 A1 Jan. 24, 2002

Related U.S. Application Data

(63) Continuation-in-part of application No. 09/353,276, filed on Jul. 14, 1999.

(51) Int. Cl.[7] .............................. A62D 3/00; B09B 3/00; F23G 5/00
(52) U.S. Cl. ..................... 588/207; 423/240 S; 110/236
(58) Field of Search ................................. 588/207, 208; 423/240 S, 240 R; 95/41, 114, 142, 147, 148, 901; 110/236; 564/67, 69

(56) References Cited

U.S. PATENT DOCUMENTS

| | | | |
|---|---|---|---|
| 5,069,689 A | * 12/1991 | Goldhaar | 55/61 |
| 5,185,134 A | * 2/1993 | Gullett et al. | 423/240 R |
| 5,453,259 A | 9/1995 | D'Souza | 423/245.1 |
| 5,458,784 A | 10/1995 | Baker et al. | 210/674 |
| 5,653,951 A | 8/1997 | Rodriguez et al. | 423/439 |
| 5,725,635 A | 3/1998 | Zubini et al. | 95/67 |
| 6,121,179 A | 9/2000 | McBrayer, Jr. et al. | 502/23 |
| 6,273,008 B1 | * 8/2001 | Taylor | |

FOREIGN PATENT DOCUMENTS

| | | | | |
|---|---|---|---|---|
| DE | 342059 A1 | * | 1/1986 | B01D/53/34 |
| DE | 4034498 A | * | 3/1992 | |
| JP | 2001046838 A | * | 2/2001 | |

* cited by examiner

*Primary Examiner*—Steven Bos
*Assistant Examiner*—Anthony Kuhar
(74) *Attorney, Agent, or Firm*—Domingue & Waddell PLC; Henry E. Naylor (57) ABSTRACT

Incineration systems, particularly those using municipal garbage and waste, refuse-derived fuels, coal and petroleum coke, and/or chlorinated hydrocarbons are operated without the release of toxic pollutants such as dioxins. One preferred embodiment relates to a non-polluting method for burning fuel derived from typical municipal garbage and waste eliminating, or at least significantly reducing, the need for the landfill disposal of such waste materials. In an alternative application, air, water, coal and/or petroleum coke are used to produce electricity, urea, and methanol in a non-polluting manner.

26 Claims, 3 Drawing Sheets

FIGURE 3

INCINERATION SYSTEM FOR REFUSE-DERIVED FUELS, COAL AND PETROLEUM COKE, OR CHLORINATED HYDROCARBONS

CROSS-REFERENCE TO RELATED APPLICATIONS

This is a continuation-in-part of U.S. Ser. No. 09/353,276 filed Jul. 14, 1999.

FIELD OF THE INVENTION

The present invention relates to incineration systems, particularly those burning municipal garbage and waste, refuse-derived fuels, biomass, coal and petroleum coke, and/or chlorinated hydrocarbons. The present incineration systems are operated in a manner in which there is substantially zero release of toxic pollutants, such as dioxins and furans, into the environment. One preferred embodiment relates to a non-polluting method for burning fuel derived from typical municipal garbage and waste eliminating, or at least significantly reducing, the need for landfill disposal.

BACKGROUND OF THE INVENTION

Coping with garbage generated by modern living is a serious global problem. In the United States municipal garbage is disposed of mainly into landfills that use up valuable land at a disturbing rate. The property value of land used in this manner depreciates tremendously and the land becomes practically useless. Furthermore, landfills are often criticized as being a health and an environmental hazard to those who live near them.

Much of the garbage taken to landfills is combustible and can be used to produce refuse-derived fuel (RDF). If certain types of materials, such as chlorinated plastics normally present in municipal waste, are not removed then toxic substances, such as dioxins and furans, can be formed and released into the environment if the RDF is burned in conventional waste-incinerating systems. This is the major reason for sending municipal waste to a landfill rather than converting it to RDF and utilizing it as fuel for producing electricity. Therefore, a practical and affordable method that will permit clean, non-polluting combustion of fuel derived from typical municipal waste is needed.

The burning of coal produces a significant portion of the world's electricity. Also, large amounts of petroleum coke are burned to produce electricity. In North America, coal reserves are abundant and in North, Central and South America the production of petroleum coke continues to grow. Yet the U.S. continues to increase its crude oil imports. Presently, greater than fifty (50%) percent of the United States' oil consumption is imported and much of that is used as fuel oil.

The technologies in use today to produce electricity, fuel and petrochemicals from coal and petroleum, create serious environmental problems. The burning of coal releases more of the greenhouse gas, carbon dioxide ($CO_2$), into the atmosphere, per unit of electricity produced, than any other method for producing electricity. Burning coal to produce electricity also releases vast amounts of nitrogen oxides ($NO_x$) into the atmosphere. New, affordable technology that will permit the burning of coal without releasing such large amounts of $CO_2$ and $NO_x$ into the atmosphere is desperately needed.

There is also a need for modifying, or constructing, new incineration systems and valorization of chlorinated residual process units so that there is substantially zero discharge of toxic substances, such as dioxins, into the environment. While various technologies have met with some commercial success, there is still a need in the art for improved methods of incinerating materials, such as municipal waste with substantially zero emissions of environmental harmful substances.

SUMMARY OF THE INVENTION

In accordance with the present invention there is provided a process for incinerating combustible material in a process unit containing an incinerating zone, and a sorption zone containing a sorbent material. The combustible material is capable of producing an effluent stream containing environmentally hazardous components such as dioxins. The process comprises:

a) incinerating said combustible waste material in said incineration zone, thereby resulting in a high temperature gaseous effluent stream containing said environmentally hazardous materials;

b) reducing the temperature of said effluent steam to a temperature below that which will be deleterious to said sorbent material;

c) conducting said lowered temperature effluent stream to said sorption zone comprised of at least one bed of sorbent material capable of sorbing substantially all of said environmentally hazardous material from said effluent stream which sorption bed has a sorption capacity;

d) collecting or venting said effluent stream which is substantially free of environmentally hazardous material;

e) reactivating said one or more sorbent beds with a reactivating agent when said one or more sorption beds reaches a predetermined capacity for sorbing said environmentally hazardous material; and f) conducting said reactivating agent, containing said environmentally hazardous material, to said incineration zone of step (a) above, wherein said environmentally hazardous material is decomposed by combustion.

In a preferred embodiment of the present invention the combustible material is selected from the group consisting of municipal waste, refuse derived fuel, biomass, and a waste material containing chlorinated hydrocarbons.

In another preferred embodiment of the present invention the effluent stream leaving the heat exchanger contains particulate matter which stream is passed to a particulate separation unit wherein at least a portion of said particulate matter is removed from said effluent stream.

In yet another preferred embodiment of the present invention the sorbent beds are comprised of at least one adsorbent selected from the group consisting of activated carbon, charcoal, molecular sieves (zeolitic materials), aluminas, silicas, and both graphitic and non-graphitic carbon nano-structures.

BRIEF DESCRIPTION OF THE FIGURES

For a further understanding of the nature and objects of the present invention, reference is made to the following detailed description, taken in conjunction with the accompanying drawings, in which like elements are given the same or analogous reference numbers, and wherein.

DETAILED DESCRIPTION OF THE INVENTION

As noted above, the present invention relates to incineration systems, particularly those that generate toxic pollutants, such as dioxins, furans, et cetera. Non-limiting examples of such waste include municipal waste, biomass, refuse-derived fuels, coal and petroleum coke and/or chlorinated hydrocarbons. In one preferred application of the present invention, there is provided a non-polluting method for burning fuel derived from typical municipal garbage and waste eliminating, or at least significantly, reducing the need for the landfill disposal of such waste materials. In another preferred application air, water, coal and petroleum coke are used to produce electricity, urea and methanol in a non-polluting manner. In a final exemplary embodiment of the present invention a valorization of chlorinated residuals process (VCR) system is used.

The present invention is directed to achieving substantially zero emission of pollutants, such as dioxins, and in the most preferred embodiments of the invention also zero emission of $NO_x$, and greatly reduced emission of the greenhouse gas $CO_2$.

An important aspect of the present invention, in which at least one and preferably two sorbent clean-up beds are used, is the routing of the hot reactivation gases exiting at least one sorbent bed back to the combustor or incinerator, which is operating at a high temperature (e.g. about 1,000° C. to about 1,500° C.). The toxic substances that are stripped from the sorbent beds during reactivation of the beds are destructed, or decomposed in the incinerator, preventing such toxic chemicals from escaping to the atmosphere.

Practice of the present invention also provides:

1. A way to incinerate municipal garbage and other such waste materials without releasing $NO_x$, dioxins and other such pollutants into the atmosphere and in essence eliminating, or at least significantly reducing, the future need for landfill disposal of such waste materials.
2. A way to modify coal-burning electric power generating plants so that such plants can operate with substantially zero $NO_x$ emission.
3. A way to use coal and/or petroleum coke to efficiently produce electricity, urea and methanol with substantially zero emission of $NO_x$, substantially zero emission of such pollutants as dioxins and greatly reduced emission of the greenhouse gas $CO_2$. By using more of America's abundant coal reserves in the non-polluting methods of the present invention, the United States' dependence on imported crude oil can be greatly reduced, while at the same time creating many much needed new jobs in the mining and use of coal, as well as in farming and down-stream farming businesses.
4. A low-cost way to modify and/or build new incinerators and valorization of chlorinated residuals process (VCR) systems that are used to destruct chlorinated hydrocarbon materials, such that there is substantially zero discharge of toxic chemicals, such as dioxins to the atmosphere.

Other highly innovative, unobvious advances and improvements are also disclosed as part of the present invention and will become clear from the following detailed description.

Figure 1:
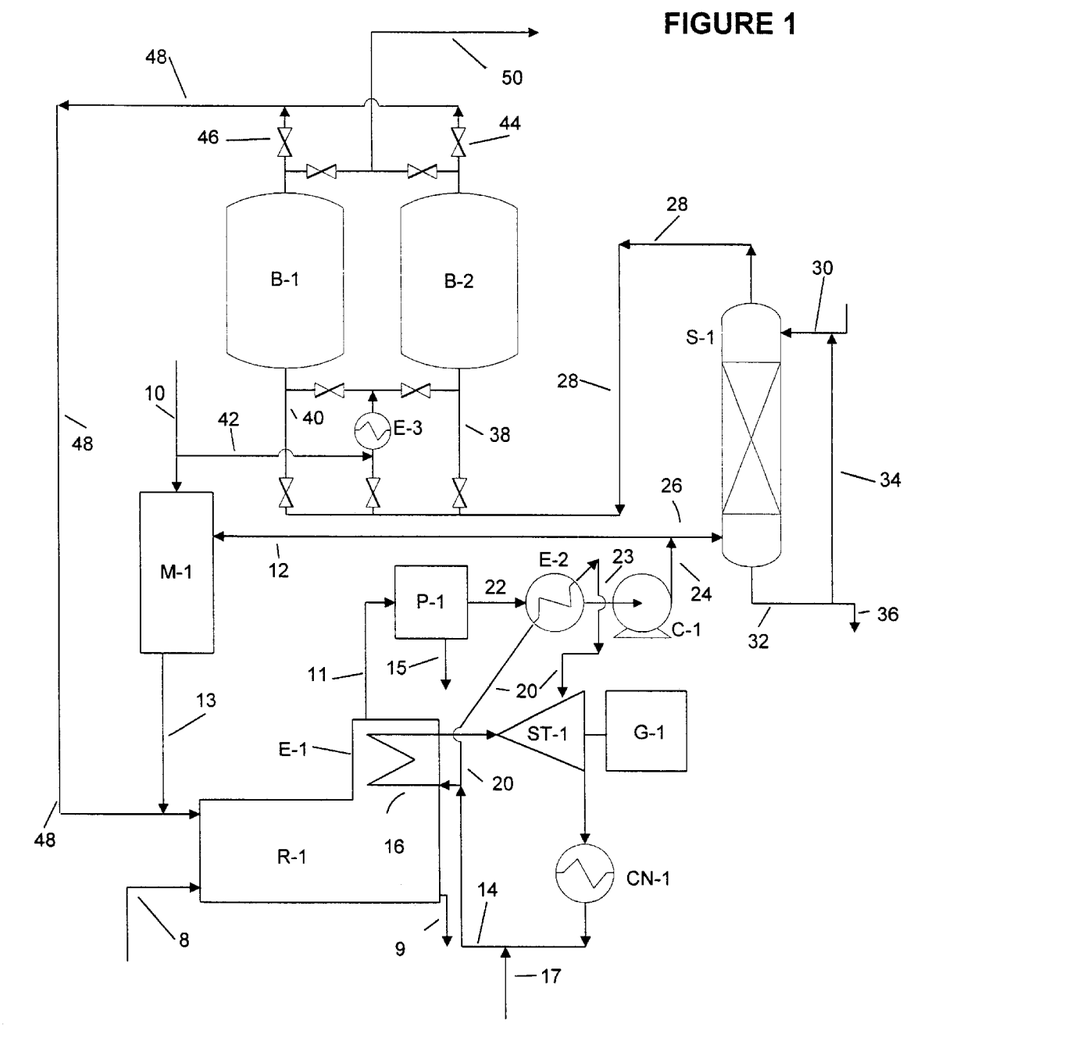
FIG. 1 is a schematic depicting a preferred process scheme for incinerating combustible materials that generate pollutants, particularly dioxins. The process results in substantially zero release of $NO_x$ and such pollutants as dioxins. The embodiment of this figure shows the blending of oxygen ($O_2$) with carbon dioxide ($CO_2$) produced during the incineration of the combustible material.

The Figures hereof present preferred embodiments for practicing the present invention. The process units and equipment represented in these figures are conventional to those having ordinary skill in the art, thus a detailed description of each is not necessary. FIG. 1 hereof depicts a process scheme for burning combustible material, preferably those selected from the group consisting of municipal solid waste, refuse-derived fuel, biomass, coal or petroleum coke. The processes of the present invention are performed so that there is substantially no release of pollutants, such as dioxins and optionally $NO_x$. The process depicted in FIG. 1 hereof involves the blending of oxygen ($O_2$) via line 10 with carbon dioxide ($CO_2$) via line 12 in mixing unit M-1. The $CO_2$ stream, which will typically contain some $O_2$, is produced during the combustion of the polluting combustible material with or without an additional solid fuel, such as coal or petroleum coke. A portion, or all, of the oxygen requirement can be obtained from any conventional source, such as an upstream air separation plant. The combustible material to be incinerated is fed to combustor R-1 via line 8. It is to be understood that the combustor can be any suitable process unit for burning such combustible materials. Non-limiting examples of combustors include chlorinated waste incinerators, valorization of chlorinated residuals process units, rotary kilns for treating soil and sediment contaminated with combustible toxic materials such as chlorinated hydrocarbons, and the like. When the combustor is one used for combusting chlorinated waste, the preferred combustible material is a chlorinated by-product material generated from a chlorinated hydrocarbon manufacturing plant, which plant produces a chlorinated hydrocarbon selected from the group consisting of ethylene dichloride, vinyl chloride monomer, methyl chloroform, trichloroethylene, perchloroethylene, allyl chloride, epichlorohydrin, mono-chlorobenzene, and dichlorobenzene.

The terms "combustor", "incinerator" and "reactor" are sometimes used interchangeably herein. Combustor R-1, is preferably a unit designed to burn municipal waste, refuse derived fuel (RDF), or biomass or mixtures thereof. Coal and/or petroleum coke may also be burned alone or with any one or more of the above mentioned combustible materials. The municipal waste can also contain substantial amounts of chlorinated hydrocarbons. Fluid bed combustors are preferred combustion units for burning such mixtures. Slag, if present, is removed from combustor R-1 via line 9.

FIG. 1 hereof includes a heat exchanger E-1, where steam is preferably produced from the heat generated in combustor R-1 in water/steam loop 14/16. The steam is preferably used to produce useful output, for example, to drive a steam turbine ST-1, that is connected to, for example, a generator G-1, for producing electricity. Make-up water can be added to the system via line 17. Also, condenser CN-1 is provided within the water/steam loop.

Compared to the reactor's (R-1) combustion temperature of approximately 1,000° C. and higher, the exhaust gases, which are comprised primarily of $CO_2$ with some $O_2$, water, and pollutants exiting the heat exchanger E-1 via line 11 are at a significantly lowered temperature (about 500° C. or less). The terms "exhaust gas" and "effluent stream" are used interchangeably herein. The temperature of the exhaust gas exiting heat exchanger E-1 will be at least 200° C., preferably at least 400° C., more preferably at least 500° C. lower than when it entered the heat exchanger. The lowered temperature exhaust gas is optionally, but preferably, passed to a solid/gas separation zone P-1 wherein particulate matter is removed via line 15. If the temperature of the exhaust gas still needs to be lowered it can be conducted through a second heat exchanger E-2 via line 22, where the exhaust gases are further cooled. Low-pressure steam can be produced via heat exchanger E-2, which is preferably also fed into the steam turbine ST-1 that can be used to produce electricity via water/steam loop 14/20. The exhaust gas steam exiting heat exchanger E-2 enters recycle compressor C-1 via line 23. Since it is preferred that no air (which is comprised mostly of nitrogen $N_2$) be fed into the combustor R-1 for this embodiment, there will be substantially no $NO_x$ present in the exhaust gas stream entering or exiting compressor C-1. Combustor R-1, is thus isolated from air during combustion, with another source of $O_2$ being provided to support combustion for rapid oxidation.

The desired portion of exhaust gases, that are comprised primarily of the $CO_2$, exiting compressor C-1, is routed via lines 24 and 12 into a mixing unit M-1, where the desired mixture of $O_2$ and $CO_2$ is formulated for feeding into the combustor R-1 via line 13. A remaining portion of the $CO_2$-containing effluent stream that is discharged from compressor C-1 will preferably be in an amount substantially equivalent to the rate at which $CO_2$ is generated in combustor R-1. The effluent stream is then routed via line 26 through scrubber S-1 wherein any acid components are neutralized by a suitable alkaline material. Scrubber S-1 will preferably be operated so that the effluent stream will pass countercurrent to a down-flowing aqueous alkaline solution introduced via line 30. It is preferred that the alkaline solution be a relatively weak solution capable of removing (neutralizing) any trace quantities of acid components that may be in the effluent stream. The alkaline solution can be any suitable basic solution that is conventionally used to neutralize such acid-containing streams. Non-limiting examples of suitable alkaline solutions include those based on alkali and alkaline-earth metals, such as sodium hydroxide, potassium hydroxide, calcium hydroxide, as well as their corresponding carbonate solutions. The alkaline solution, after contacting the up-flowing effluent stream, will contain salts of those acids that were extracted from the gaseous stream. At least a portion of this alkaline solution can be recycled to scrubber S-1 via lines 32, 34, and 30. It is preferred that this salt-containing alkaline solution purge stream be passed via line 36 through a sorption bed (not shown) to capture any trace quantities of pollutants, such as dioxins and furans, that may be present in the salt-containing alkaline solution. After exiting the sorption bed, the sorbed effluent stream 36 can be discharged into large flow aqueous streams, or to any suitable conventional separation unit for removal of the salts.

The scrubbed exhaust gas stream exiting scrubber S-1 via line 28 will be comprised primarily of $CO_2$, with minor amounts of $O_2$, as well as any chlorinated pollutants. This stream is routed via lines 28, 38, and 40 through one or more, preferably one of two sorption (clean-up) beds B-1 and B-2 to remove pollutants, particularly chlorinated pollutants (dioxins) and furans. If the sorption material is charcoal or activated carbon, the effluent exiting S-1 will preferably be at a temperature less than the combustion temperature of the carbon bed, which is about 88° C.

Clean-up beds B-1 and B-2 contain any suitable sorbent material capable of removing, typically by adsorption, at least a portion or preferably substantially all of the pollutants, particularly dioxins, from the $CO_2$ containing effluent stream. Non-limiting examples of suitable sorbents include both amorphous and graphitic carbon, preferably charcoal and activated carbon; molecular sieves (zeolitic materials); aluminas; and silicas. It is also within the scope of this invention that graphitic and non-graphitic carbon nanostructures be used as the sorbent material. Non-limiting examples of suitable carbon nanostructures include those disclosed in U.S. Pat. Nos. 5,653,951 and 5,458,784, both of which are incorporated herein by reference. Preferred are molecular sieves and activated carbons; more preferred are activated carbons. Any suitable form of activated carbon can be used in the practice of the present invention. For example, activate carbon is typically commercially available in forms such as granular, powdered, pelleted and as cloths or fibers. Preferred are pelleted and cloth forms with the pelleted form being more preferred. The terms sorbent and adsorbent are sometimes used interchangeably herein. The important aspect is that the sorbent be able to selectively remove (sorb) the pollutants from the $CO_2$ containing effluent stream.

When either bed, B-1 or B-2, needs to be reactivated, a suitable reactivating agent is used. The reactivating agent can be any suitable gas or liquid reagent that is capable of desorbing the adsorbed species from the sorbent material of the sorbent beds. If the reactivating agent is a gas, then it is preferred to use carbon dioxide ($CO_2$) with or without oxygen ($O_2$) via line 42 that is routed through heat exchanger E-3, where the mixture is heated by steam or any other suitable means to raise the temperature to a level satisfactory for reactivating the bed. If the bed's sorbent material is composed of an activated carbon material the reactivating agent, if $CO_2$, can be enriched with $O_2$ and then heated to temperature that will initiate an exothermic reaction between $O_2$ and the carbon sorbent material. Higher temperature reactivating gases are preferred because less carbon would need to be burned the higher the temperature of the gas. Such a temperature will typically be from about 110° C. to about 150° C., preferably from about 115° C. to about 130° C. The flow rate and $O_2$ content of the reactivating gas stream is preferably controlled to achieve the required temperature for properly reactivating the sorbent bed.

The gases exiting sorbent beds B-1 and B-2 via line 44 and 46 during reactivation are preferably conducted back to combustor R-1 via line 48. This assures that all pollutants released from the sorbent beds during reactivation are subjected to high-temperature combustion (decomposition) and thus are converted to harmless compounds.

Likewise, if the sorbent material in beds B-1 and B-2 is activated carbon, and a hot $CO_2/O_2$ mixture is used for reactivation, then a portion of the carbon will be converted to $CO_2$ during each reactivation. Hence, make-up carbon (not shown) will periodically be added to beds B-1 and B-2.

Sorbent beds used for any of the process schemes of this invention can also be reactivated by use of a suitable liquid or gaseous solvent. Suitable solvents are those that: are effective for desorbing pollutants from the sorbent material; will not appreciably react with the pollutants or sorbent material; and have a substantially different, preferably substantially lower, boiling point than the pollutant species being desorbed. Of course, the greater the difference in boiling point between the solvent and the pollutants being desorbed, the more preferred the solvent. The greater difference in boiling point makes it easier to separate the solvent from the pollutant material in a subsequent separation step wherein it is preferred to distill or flash-off the solvent for recycle, leaving the pollutant material that can be conducted to combustor R-1 where it was initially produced. An alternative would be to burn the concentrated pollutant material in an incinerator other than the one in which it was produced. This other incinerator can be on-site with combustor R-1 or it can be an off-site incinerator wherein to which the pollutant material is transported.

If the material being combusted, or incinerated, is municipal garbage, RDF, biomass, contaminated soils or sediments, petroleum coke, coal, or a mixture thereof and if the level of chlorinated pollutants is relatively low then it is preferred that the extraction solvent be a non-halogenated hydrocarbon, preferably a hydrocarbon stream normally found in a petroleum refinery. By "relatively low" we mean that the material to be combusted has less than about 1000 wppm halogen content, preferably chloride content. Non-limiting examples of suitable hydrocarbon solvents that can be used as desorbents include both aromatic and non-aromatic solvents. Non-limiting examples of suitable non-aromatic solvents are $C_1$ to $C_{10}$ alkanes. In one preferred embodiment, a normally gaseous solvent, such as butane or propane, can be used under pressure so that the desorption is performed when the solvent is in the liquid stage. The solvent, such a propane plus desorbed pollutants, can then be passed to a separation zone (not shown) where the normally gaseous solvent will flash-off, leaving the desorbed pollutant material behind so that it can be conducted to combustor R-1. Preferred aromatic solvents include toluene and xylene. If the solvent is a refinery stream it can be a stream withdrawn from process tower vessels, such as a hydrocracker distillation tower. One preferred refinery stream is a naphtha stream.

If the material being incinerated has a relatively high level of chlorinated material, the resulting pollutants will be composed of relatively high levels of toxic dioxins and furans. Significant levels of hydrogen chloride will also be present in the effluent stream. These types of materials require incinerating systems specially designed for handling chlorinated waste materials, such as the system depicted in FIG. 3 hereof. When solvent extraction is used for reactivating the sorbent beds, integrated with systems for incinerating chlorinated waste, it is preferred that the desorbent solvent be a chlorinated solvent. Non-limiting examples of such chlorinated solvents that can be used in the practice of the present invention include 1,2-dichloroethane, methylene chloride, cis and trans dichloroethylene, ethyl chloride, methyl chloride, trichlorethylene and the like.

The desorbent solvent will enter sorbent bed B-1 and/or B-2 where it contacts the sorbent and desorbs the pollutants therefrom. The desorbent solvent can be either a liquid or vapor during this stage, with liquid being preferred. The desorbent solvent, which now carries the desorbed pollutants is passed to a separation zone (not shown) where the solvent is separated from the desorbed pollutants by any suitable means. The separation zone will be any such zone suitable for separating two components by boiling point, such as by flashing or distillation. The solvent can be recycled and used again to desorb pollutants from a sorbent bed and the pollutant latent material is passed to combustor R-1 where it is decomposed by combustion.

The substantially pollutant-free $CO_2$ stream exiting sorbent beds B-1 or B-2 via line 50 will typically contain a minor quantity of $O_2$. This stream can be either vented to the atmosphere or it can used to react with, for example, ammonia to produce urea, and/or to react with hydrogen to produce methanol.

The scheme presented in FIG. 1 provides a non-polluting method for burning municipal waste or fuel derived from typical municipal garbage and waste eliminating, or at least substantially reducing, the need for the landfill disposal of such waste materials.

Figure 2:
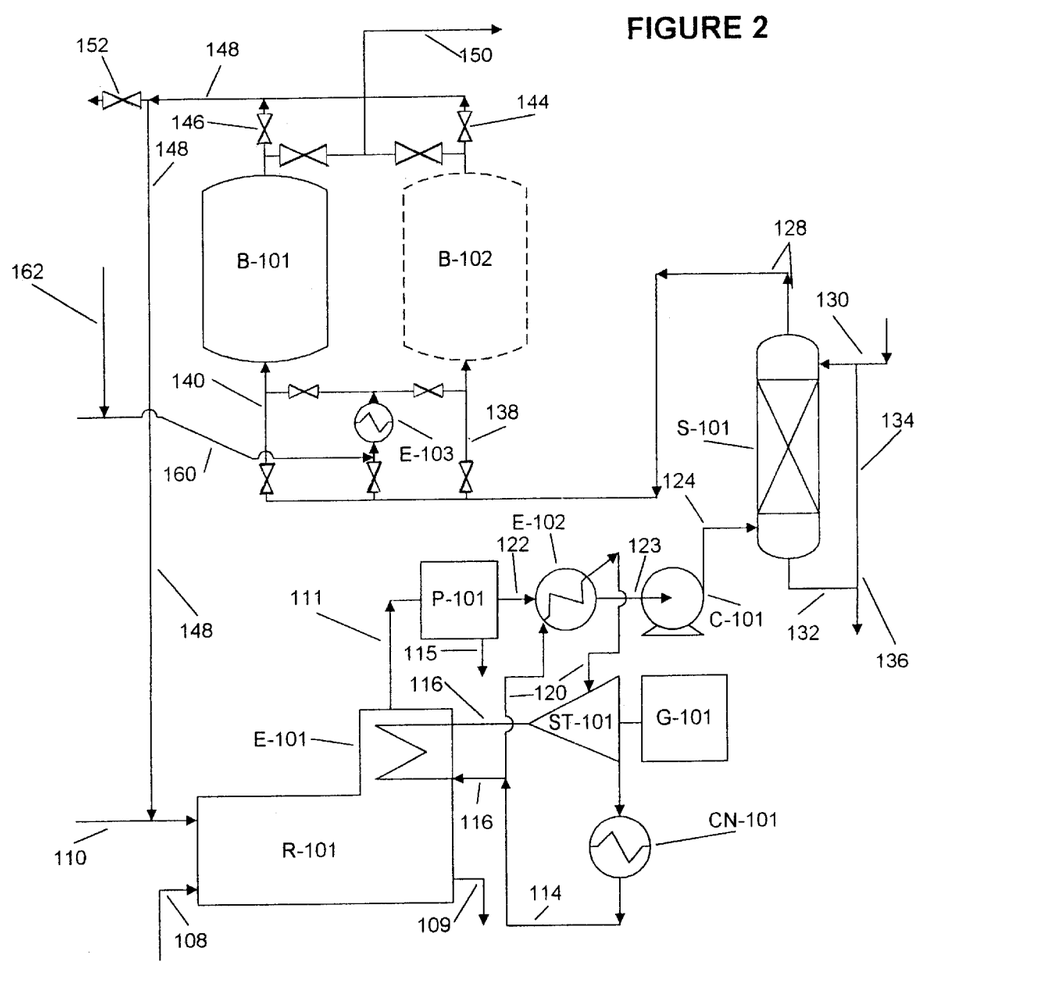
FIG. 2 is a schematic depicting a second preferred embodiment illustrating a low-cost method for accomplishing the objective of avoiding the release of such pollutants as dioxins into the atmosphere, while not choosing to curb the release of $NO_x$ and $CO_2$, in which scheme, air is employed as the source of the $O_2$ required for combustion.

If one chooses only to avoid the release of such things as dioxins to the atmosphere, but does not choose to also curb the release of $NO_x$ and $CO_2$, as achieved in the embodiment of FIG. 1 herein, then FIG. 2 represents a practical, low cost method for accomplishing this alternative embodiment. In FIG. 2 hereof, those objects that were previously discussed for FIG. 1 are numbered in a similar way except they are a numbered 100 higher than those of FIG. 1. In this scheme, air is employed via line 110 as the source of the $O_2$ required for the combustion of the combustible material that is introduced in combustor R-101 via line 108. When the products of combustion exit scrubber S-101 via line 128, the stream primarily comprises $CO_2$, $N_2$, $O_2$ and water vapor and possibly trace quantities of such toxic pollutants as dioxins. This scrubbed effluent stream is routed into and through either or both sorbent beds B-101 and B-102. Each bed contains a sorbent material as previously discussed that is capable of removing, from the effluent stream, substantially all of the pollutants, such as dioxins, from the stream.

The effluent stream exiting the sorbent bed that is in service for removing pollutants can be discharged to the atmosphere via line 150 since the effluent stream is now substantially free of toxic compounds, such as dioxins. The vented stream will typically be comprised of $N_2$, $CO_2$, and $O_2$, along with trace amounts of $NO_x$.

When the sorption capacity of the sorbent bed in service nears exhaustion, flow can be diverted through the other sorbent bed using appropriate piping (details of the valves, pipe lines, etc., being well known to those of ordinary skill in the art) and swinging the bed off-line so it can be reactivated. Reactivation can be performed as previously discussed herein.

If the clean-up beds contain sorbent material other than activated carbon, and if a solvent is not used, the source of heat for the heat exchanger E-103 can be, for example, fired natural gas or fired fuel oil, in order to heat the reactivation air to a high enough temperature to drive the dioxins and other such pollutants out of the adsorbent beds. This temperature of course will depend on the particular dioxin species sorbed on the sorbent material and will typically be in excess of 180° C., preferably in excess of 200° C.

As previously mentioned, if activated carbon is used as the sorbent material, then the reactivation air, as it passes through heat exchanger E-103, only has to be heated to a high enough temperature, such as, for example, a temperature of about 120° C., to initiate a reaction between the $O_2$ in the heated reactivation air stream and the activated carbon itself. This reaction is exothermic, and the desired reactivation temperature of the bed can be achieved simply by controlling the rate of flow of the reactivation air. This approach preferably uses a periodic, alternate recharging of the clean-up beds with necessary amounts of activated carbon. It will be understood that if a liquid solvent is used to extract the pollutants from the sorbent beds steam heat can be used to reactivate the beds.

An important, novel and unique aspect of this embodiment is the routing of the reactivation gases exiting either of the sorbent beds back to combustor R-101 via line 148, wherein the toxic pollutants that were released, or desorbed, from the sorbent beds during reactivation are decomposed in the combustor preventing such toxic chemicals from escaping to the atmosphere.

The embodiment represented in FIG. 2 hereof also shows a supply of nitrogen via line 162 that can be passed through the sorbent bed to cool it down immediately after reactivation. During the cooling procedure, the $N_2$ exiting the bed being cooled is vented via lines 148 and 152, preferably to the atmosphere. The bed is also preferably cooled to about ambient temperature before putting it back into service.

Figure 3:
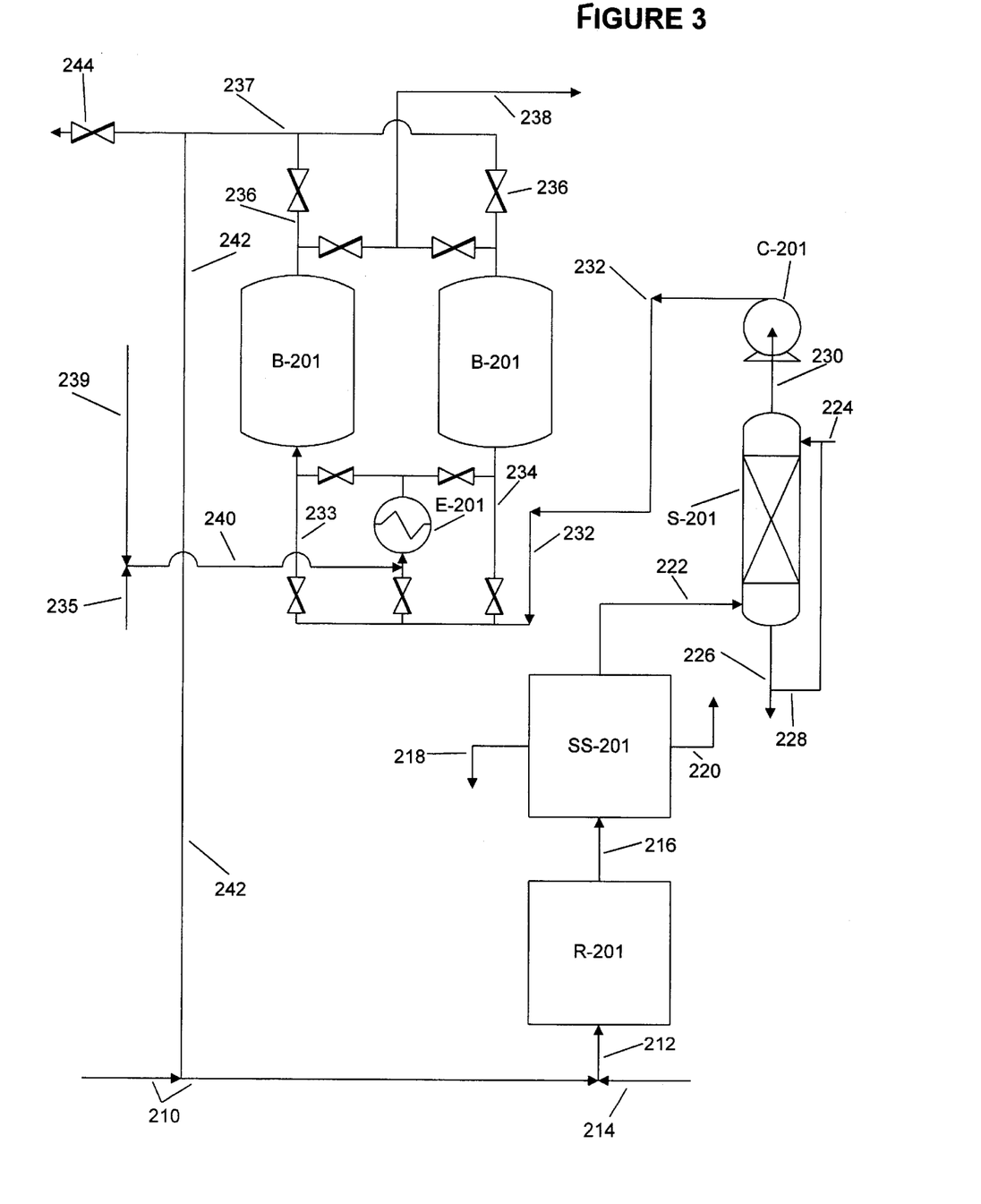
FIG. 3 is a schematic depicting yet another preferred embodiment of the present invention, wherein, $CO_2$ and $NO_x$ are released into the atmosphere, while destructing chlorinated hydrocarbon waste through high-temperature oxidation, with substantially zero release of dioxins and other such toxic pollutants to the atmosphere. In this embodiment, air is the source of the oxygen required to carry out the oxidation of chlorinated hydrocarbon waste materials, either in conventional chlorinated waste incinerators or in VCR systems.

If one chooses to continue releasing $CO_2$ and $NO_x$ into the atmosphere, while destructing chlorinated hydrocarbon waste through high-temperature oxidation, then the embodiment presented in FIG. 3 hereof offers a practical and low-cost way for doing so with substantially zero release of dioxins and other such toxic pollutants into the atmosphere.

In this embodiment, air is the source of the oxygen required to carry out the oxidation of chlorinated hydrocarbon waste materials that are introduced into combustor R-201 via lines 210 and 212. The combustor can be a valorization of chlorinated residuals process unit or a conventional waste incinerator typically used to incinerate chlorinated waste materials. Both liquid and gaseous chlorinated materials can be fed via lines 214 and 212 into combustor R-201 wherein they are oxidized by combustion. The effluent stream from combustor R-201, which will typically be comprised of HCl, $N_2$, $CO_2$, $H_2O$, $O_2$ and chlorinated pollutants, is passed to sorption/scrubber SS-201 via line 216 where at least a portion of the HCl and at least a portion of the $H_2O$ are removed. In a preferred embodiment, water is collected via line 218 and the HCl is collected via line 220. The scrubbed effluent stream exiting SS-201 is then passed via line 222 to scrubber S-201 where it is contacted with a countercurrent downward flowing stream of aqueous alkaline solution introduced via line 224. As previously described with respect to FIGS. 1 and 2 hereof, the aqueous alkaline solution will remove trace acid components and produce salts therefrom. At least a portion of the aqueous solution containing salts of the adsorbed acid(s) is collected from S-201 via line 226. Another portion, if desired, can be recycled via line 228. The scrubbed effluent stream from scrubber SS-201 is passed to compressor C-201 via line 230.

In the case where the water purged from SS-201 is distilled water that is free of toxic pollutants, and the HCl exiting SS-201 via line 220 is high purity anhydrous HCl gas, the toxic pollutants captured by the liquid scrubbing stream are removed by passing the liquid stream, recirculating within SS-201, through activated carbon sorption beds. For an SS-201 unit producing a liquid hydrochloric acid stream that is discharged via line 218, that discharge stream is passed through activated carbon beds to remove the trace quantities of dioxins and furans with those beds being reactivated as previously described.

The effluent-stream exiting compressor C-201 via line 232 will be comprised of primarily $CO_2$, $N_2$, $O_2$, small amounts of water vapor and any toxic pollutants that were generated during combustion. The stream exiting compressor C-201 is preferably routed via line 232 and 234 and 233 to either of clean-up beds B-201 or B-202. Each of these beds will independently contain sorbent material as previously described. By independently, we mean that each bed can contain the same, or a different, sorbent material. The effluent stream exiting the sorbent bed that is in service for capturing the toxic pollutants can be discharged to the atmosphere via lines 236 and 238. The stream vented to the atmosphere will typically be comprised of $N_2$, $CO_2$, and $O_2$ with the presence of a minute amount of $NO_x$. This stream will be substantially free of toxic pollutants, such as dioxins. Nitrogen can be conducted via lines 239 and 240 to heat exchanger E-201 and through a sorption bed to cool it down immediately after reactivation. During cooling, the nitrogen exiting the bed being cooled is preferably vented to the atmosphere via lines 236, 237 and 241.

When the bed in service nears it sorption capacity, flow can be diverted through the other bed, and the spent bed is then reactivated. Reactivation can be accomplished as previously described. For example, it can be reactivated by passing compressed air, via lines 235 and 240, through heat exchanger E-201. If beds B-201 or B-202 contain sorbent material other than activated carbon, the source of heat for the heat exchanger E-201 preferably is, for example, fired natural gas in order to heat the reactivation air to a temperature high enough to drive dioxins and other such captured pollutants out of the sorbent beds.

A unique aspect of this scheme is the routing of the reactivation gases exiting either sorption bed B-201 or B-202 back to combustor R-201 via lines 236, 237, 242, 210, and 212 where the toxic pollutants, stripped or desorbed from the sorbent bed during reactivation, are destructed, thus representing a closed-loop system with respect to such pollutants and preventing any toxic chemicals from escaping to the atmosphere.

It is to be understood that the sorbent beds need not be reactivated for the practice of the present invention. For example, in one preferred embodiment, the sorbent beds can be such that substantially spent sorbent material is conducted from the sorbent bed to the combustion zone where it is decomposed along with any sorbed pollutant material. Of course, in such case, it is preferred that the sorbent material be a carbon material. The spent sorbent material can be conducted from the bed by any suitable means. One suitable means would be a continuous moving bed of sorbent material moving countercurrent to the effluent stream so that spent sorbent material is continuously conducted from one end of the bed and fresh sorbent material is continuously fed to the other end of the bed. This approach can be practiced when relatively inexpensive sorbent materials, such as calcined coke or charcoal are used.

It is noted that the embodiments described herein in detail for exemplary purposes are, of course, subject to many different variations in, for example, structure, design, application, equipment, chemical components and/or methodology. Because many varying and different embodiments may be made within the scope of the inventive concept(s) herein taught and because many modifications may be made in the embodiments herein detailed in accordance with the descriptive requirements of the law, it is to be understood that the details herein are to be interpreted as illustrative and not in a limiting sense.

What is claimed is:

1. A process for incinerating combustible material in a process unit containing an incinerating zone, and a sorption zone containing one or more beds of a sorbent material, wherein said combustible material is capable of producing an effluent stream containing environmentally hazardous components, which process comprises the steps of:

a) incinerating said combustible waste material in said incineration zone, thereby resulting in a high temperature gaseous effluent stream containing said environmentally hazardous components;

b) reducing the temperature of said effluent stream of step a) to a temperature below that which will be deleterious to said sorbent material;

c) conducting said reduced temperature effluent stream of step b) to said sorption zone comprised of one or more beds of sorbent material capable of sorbing substantially all of said environmentally hazardous components from said effluent stream of step b) which one or more beds of sorbent material has a sorption capacity;

d) collecting or venting said effluent stream of step c) which is substantially free of environmentally hazardous components;

e) reactivating said one or more beds of sorbent material with a reactivating agent; and f) conducting said reactivating agent, containing said environmentally hazardous components, to said incineration zone of step (a) above, wherein said environmentally hazardous components is decomposed by combustion.

2. The process of claim 1 wherein said combustible material is selected from the group consisting of municipal waste, refuse derived fuel, biomass, and a waste material containing chlorinated hydrocarbons.

3. The process of claim 1 wherein said effluent stream of step b) contains particulate matter which stream is passed to a particulate separation unit wherein at least a portion of said particulate matter is removed from said effluent stream.

4. The process of claim 1 wherein said reduced temperature effluent stream of step b) is passed to a scrubbing zone wherein it is passed countercurrent to an aqueous alkaline solution thereby removing at least a portion of any acid components in said effluent stream.

5. The process of claim 1 wherein said one or more beds of sorbent material are comprised of at least one adsorbent selected from the group consisting of activated carbon, charcoal, molecular sieves, aluminas, silicas, and both graphitic and non-graphitic carbon nanostructures.

6. The process of claim 5 wherein said adsorbent is an activated carbon.

7. The process of claim 1 wherein the reactivating agent is selected from the group consisting of $CO_2$, air, nitrogen and mixtures thereof.

8. The process of claim 4 wherein the aqueous alkaline solution exiting the scrubbing zone contains toxic pollutants and salts of the acids removed from the reduced temperature effluent stream of step b) wherein said alkaline solution is passed through a sorption zone to remove said pollutants.

9. The process of claim 1 wherein the incineration zone is operated with a mixture of $CO_2$ and $O_2$.

10. The process of claim 1 wherein the incineration zone is operated with air.

11. A process for incinerating combustible waste material containing a substantial amount of chlorinated hydrocarbons in a process unit containing an incinerating zone, at least one scrubbing zone, and a sorption zone containing one or more beds of sorbent material capable of sorbing toxic pollutants from a gaseous effluent stream, which process comprises the steps of:

a) incinerating said combustible waste material in an incineration zone wherein air is used as a combustion agent, thereby resulting in a high temperature gaseous effluent stream containing chlorinated waste products;

b) reducing the temperature of said high temperature effluent stream to a temperature below that which will be deleterious to said sorbent material;

c) conducting said lowered temperature effluent stream of step b) to a first scrubbing zone wherein at least a portion of any water and hydrogen chloride present in said lowered temperature effluent stream of step b) is removed, thereby resulting in a scrubbed effluent stream;

d) conducting said scrubbed effluent stream to a second scrubbing zone wherein said scrubbed effluent stream is further scrubbed with an alkaline solution thereby removing at least a portion of any acid component that is present in said effluent stream and resulting in a salt-containing alkaline solution;

e) conducting said further scrubbed effluent stream to a sorption zone comprised of at least one bed of sorbent material capable of sorbing substantially all of any remaining toxic pollutants from said effluent stream, which sorption bed has sorption capacity;

f) collecting or venting said effluent stream of step e) containing substantially zero toxic pollutants;

g) reactivating said one or more sorbent beds with a reactivating agent; and h) conducting said reactivating agent, containing said toxic pollutants to said incineration zone of step (a) above, where said toxic pollutants are decomposed by combustion.

12. The process of claim 11 wherein the combustible material is a chlorinated by-product material generated from a chlorinated hydrocarbon manufacturing plant, which plant produces a chlorinated hydrocarbon selected from the group consisting of ethylene dichloride, vinyl chloride monomer, methyl chloroform, trichloroethylene, perchloroethylene, allyl chloride, epichlorohydrin, mono chlorobenzene, and dichlorobenzene.

13. The process of claim 11 wherein said one or more beds of sorbent material are comprised of at least one sorbent selected from the group consisting of activated carbon, charcoal molecular sieves, aluminas, silicas, and both graphitic and non-graphitic carbon nanostructures.

14. The process of claim 13 wherein said adsorbent is an activated carbon.

15. The process of claim 11 wherein the reactivating agent is selected from the group consisting of $CO_2$, air, nitrogen and mixtures thereof.

16. The process of claim 11 wherein the alkaline solution exiting the second scrubbing zone contains salts of the acids removed from the scrubbed effluent stream as well as trace amounts of pollutants, where said salt-containing alkaline solution is passed through a sorption zone comprised of one or more beds of sorption material to remove said trace pollutants.

17. The process of claim 16 wherein said one or more beds of sorbent material capturing trace pollutants from said aqueous alkaline solution is reacted with a reactivating agent thereby desorbing said pollutants into said reactivating agent.

18. The process of claim 17 wherein said reactivating agent containing said pollutants is recycled to said incineration zone where said pollutants are decomposed by combustion.

19. The process of claim 11 wherein hydrogen chloride removed in said first scrubbing zone is present in internal liquid hydrochloric acid recirculating stream and/or in liquid hydrochloric acid purge steam.

20. The process of claim 19 wherein said internal liquid hydrochloric acid recirculating stream and said liquid hydrochloric acid purge stream are passed through a sorption zone containing one or more beds of sorbent material to remove toxic pollutants.

21. The process of claim 20 wherein said one or more beds of sorbent material sorbing toxic pollutants from said internal liquid hydrochloric acid recirculating stream and said liquid hydrochloric acid purge stream is treated with a reactivating agent thereby desorbing said pollutants into said reactivating agent.

22. The process of claim 21 wherein said reactivating agent contains said pollutants and is recycled to said incineration zone where said pollutants are decomposed by combustion.

23. A process for incinerating combustible material in a process unit containing an incinerating zone, and a sorption zone containing one or more beds of a sorbent material, wherein said combustible material is capable of producing an effluent stream containing environmentally hazardous components, which process comprises the steps of:
   a) incinerating said combustible waste material in said incineration zone, thereby resulting in a high temperature gaseous effluent stream containing said environmentally hazardous components;
   b) reducing the temperature of said effluent steam of step a) to a temperature below that which will be deleterious to said sorbent material;
   c) conducting said reduced temperature effluent stream of step b) to said sorption zone comprised of one or more beds of sorbent material capable of sorbing substantially all of said environmentally hazardous components from said effluent stream of step b) which one or more beds of sorbent material has a sorption capacity;
   d) collecting or venting said effluent stream of step c) which is substantially free of environmentally hazardous components;
   e) conducting at least a fraction of said sorbent material that has substantially reached its sorption capacity to said incineration zone.

24. The process of claim 23 wherein said sorbent material is comprised of a carbon material.

25. The process of claim 1 wherein the reactivating agent is an organic solvent.

26. The process of claim 11 wherein the reactivating agent is an organic solvent.

* * * * *